A. ENGLISH

3,386,816

AGGLOMERATION OF IRON OXIDE MATERIAL

Filed June 22, 1965

INVENTOR.
ALAN ENGLISH

BY *Bosworth, Sessions,*
*Herrstrom & Knowles*
ATTORNEYS

June 4, 1968 A. ENGLISH 3,386,816
AGGLOMERATION OF IRON OXIDE MATERIAL
Filed June 22, 1965 4 Sheets-Sheet 3

INVENTOR.
ALAN ENGLISH
BY
Bosworth, Sessions,
Herrstrom & Knowles
ATTORNEYS

INVENTOR
ALAN ENGLISH
BY Bosworth, Sessions,
Herrstrom and Knowles
ATTORNEYS 3,386,816
AGGLOMERATION OF IRON OXIDE MATERIAL
Alan English, Cleveland Heights, Ohio, assignor to
Arthur G. McKee & Company, Cleveland, Ohio, a
corporation of Delaware
Filed June 22, 1965, Ser. No. 466,048
15 Claims. (Cl. 75—33)

ABSTRACT OF THE DISCLOSURE

Process and apparatus for agglomerating and reducing finely divided solid materials such as iron oxide by making green balls of the material, then heating the green balls while they travel in a quiescent state in a body to dry them but not harden them by recrystallization, and then heating the balls under reducing conditions in a kiln. Preferably the balls are then cooled in an atmosphere containing carbon dioxide and carbon monoxide that causes reoxidation of the surface of the balls by reaction of carbon dioxide with reduced metal to form a weather-resistant coating. The disclosure also includes the concept of removing undesirable materials such as zinc from the finely divided material.

---

This invention relates to the agglomeration of finely divided solid iron oxide material that is capable of being agglomerated by heat, and more particularly to a process and apparatus for the agglomeration and at least partial reduction of such material and to the product that may be produced by the process.

While the invention is applicable to the agglomeration of various types of finely divided iron oxide materials including beneficiated iron ores or the like, for convenience it will be primarily discussed hereinafter in connection with the agglomeration and partial reduction of dust produced by basic oxygen steel-making furnaces such as those of the well known so called L.D. type, and the production from such dust hardened, partially-reduced, weather resistant pellets that are free of harmful quantities of undesirable impurities and are suitable for use in furnaces that can recover the iron content of the dust, such as blast furnaces or basic oxygen steel furnaces.

This dust is that collected by apparatus that removes dust from the gases produced by basic oxygen steel-making furnaces. In general, the community relations of the steel producer, or government laws or regulations, necessitate the removal of as much of this dust as possible from the furnace gases discharged to the atmosphere, since otherwise the dust could constitute a nuisance.

Large amounts of this dust are produced, productions up to about 5% by weight of the steel produced by basic oxygen furnaces being not uncommon. Up the the present, however, the recovered dust has usually been disposed of by burying it or hauling it away, although some has been sintered, usually in admixture with other iron oxide-containing dusts such as open hearth furnace flue dusts, for reuse in the blast furnace. In general, however, most of the dust has not been used in ways that recover its iron content, even though as much as 60% or more of the weight of the dust is iron in the form of iron oxides such as alpha or gamma hematites.

Two major characteristics of the dust render it difficult to use this dust in furnaces such as blast furnaces or steel-making furnaces for recovery of its iron content. One characteristic is that the dust is largely in the form of very small, essentially spherical, smooth particles. The major proportion of the dust, even as much as about 90%, is of an extremely small particle size, as about —325 mesh, while only a small proportion is of a larger particle size, as of about +28 mesh. The small particle size renders impossible the use of the dust without agglomeration into larger sizes; and the smooth, spherical physical structure renders agglomeration difficult.

Another troublesome characteristic is that the dust usually contains substantial amounts of compounds of zinc or other elements, such as lead, having melting points considerably lower than iron, which are undesired either because they alloy with the steel to cause undesired metallurgical characteristics or because they produce difficulties in furnaces.

Zinc, for example, is very troublesome in blast furnace charge material; the compounds in which it is usually present often are reduced in the lower regions of the blast furnace stack and the resulting metallic zinc is volatilized, driven upward, and oxidizes to zinc oxide that condenses on the walls of the colder part of the flues and, in time, can obstruct small passages sufficiently to impede gas flow. Zinc oxide also tends to combine with alumina in the firebrick lining of the furnace, causing the brick to expand with damaging results which may eventually cause destruction of the lining. Zinc in the vapor phase also tends to react with the refractories of the furnace and associated ducts to form easily fused salts.

Lead can alloy with iron and can render the resulting steel unfit for its intended use. Lead is also harmful to furnace bottoms and refractories, since it tends to penetrate joints or cracks to form channels that may be followed by the molten iron or steel in the furnace.

Zinc occurs in the basic oxygen furnace dust because zinc-containing scrap steel such as galvanized steel often is charged into the basic oxygen furnace; and lead occurs because it is introduced by terne plate scrap. Such materials are charged because of difficulties or high costs of sorting the scrap to eliminate them. In the basic oxygen furnace, the zinc content and the lead content of the scrap tend to vaporize off as metallic zinc and lead since their melting points are substantially lower than that of iron. The zinc usually is transformed into a major portion of zinc ferrite and a minor portion of zinc oxide as it travels through the exhaust system to the dust collectors. The lead is converted into one or more of the lead oxides as it travels to the collectors. It is not uncommon for collected basic oxygen furnace dust to contain zinc up to 8% or 9% by weight of the iron oxide, and lead up to more than 1% by weight of the iron oxide.

By the process and apparatus of the present invention, the basic oxygen flue dust can be agglomerated into hard pellets strong enough to withstand handling, storage and charging into a furnace, which pellets contain a substantial proportion of reduced iron and are essentially free of zinc and lead, as well as arsenic if it was initially present. If desired, the pellets may be made so that about 40% to about 80% or more of the iron content of the pellets is in the form of metallic iron, rendering them advantageous for charging directly into a basic oxygen furnace in place of scrap, or for charging into a blast furnace, depending on the metallic iron content. According to the invention such pellets may be made to have a thin, tough, hard, highly-adherent, substantially impervious, substantially continuous surface coating or layer of an iron-oxygen compound that resists oxidation of the pellets on weathering and adds to their physical strength.

It is an object of the invention to provide a process and apparatus whereby finely divided iron oxide material may be agglomerated into hardened pellets, with substantial reduction of the iron content thereof to metallic iron. Another object is the provision of a process and apparatus for producing such pellets from finely divided iron oxide material containing undesirable constituents which are removed during reduction of the iron oxide. A further object is the provision of a process and apparatus for agglomerating basic oxygen furnace dust into a form rendering it usable for use in furnaces to permit recovery of its iron content. A further object is the provision of an improved process for preheating and agglomerating preformed green balls of iron oxide material under conditions in which the balls are preheated under oxidizing conditions, heat-hardened under reducing conditions, and cooled under conditions as will produce a surface coating having the above described characteristics. Another object is the provision of pellets of the characteristics described above.

These and other objects of the invention will become apparent from the following description thereof, reference being had to the accompanying drawings in which.

Briefly, the process of the present invention involves first forming the finely divided iron oxide material, which in the illustrated case is basic oxygen furnace dust, into green balls of a substantially uniform preselected size, between about ¼″ and about 1″, and preferably about ⅜″, in diameter. The dust is first preferably premoistened, as by suitable conventional means, and then formed into such balls by suitable balling apparatus, which may be a conventional balling disk or balling drum, water being added if necessary. If desired, the balling mixture may include a small amount, up to about 1%, of an acid such as hydrochloric acid in aqueous solution, or a suitable binding material as from 1% to 5% of bentonite, or both acid and the bentonite, to improve the strength of the green balls.

The green balls, after suitable screening operations, etc., are then preheated to dry them, by subjecting them to a temperature between about 250° F. and about 800° F. for a period, usually between about 4 and about 10 minutes, that is long enough to dry the balls and develop in them sufficient strength to permit them to be subjected to subsequent tumbling in the kiln without cracking or substantial breakage, the shorter periods in general being utilized when higher drying temperatures are used. The temperature and duration of the heating are not of sufficient magnitude to cause appreciable grain growth or bridging of grains of the iron oxide grains. Desirably, the green balls are deposited into a gas-permeable movable body or layer of substantially uniform thickness in which the balls are at rest relative to each other within the body; this can be accomplished by known prior art means including means for distributing the balls onto a gas-permeable traveling grate or traveling conveyor, such as a horizontal straight grate or conveyor.

The balls are then discharged into a refractory-lined kiln that is slowly rotated. As the balls pass into the kiln, particles of solid reductant, preferably a low ash material such as coke, although anthracite coal or other carbonaceous materials could be used, are also discharged into the kiln to form a thoroughly intermixed admixture of balls and reductant. The particle size of the reductant is quite important, since the desired iron oxide reduction and removal of zinc and similar materials are greatly enhanced when substantially no particles of reductant are larger than the average maximum size of the green balls; essentially all particles of reductant may be substantially smaller than the balls, even down to dust-like particles. Coke breeze may be used very advantageously. The solid reductant preferably amounts to between about 50% and 100% of the weight of the iron oxide in the balls and between 60% and 120% of the volume of the green balls. Preferably, the balls and reductant particles are added simultaneously and continuously to the kiln in the desired relative proportions. Surprisingly, little breakage or degradation of the balls occurs as they are tumbled in the kiln, even though they are merely dried before being introduced into the kiln. The particles of solid reductant of the indicated size and in the indicated volumetric relationship cushion and protect the green balls against abrasion or breakage as they are tumbled in the kiln.

As the kiln is rotated and the mixture of balls and reductant is tumbled anp passes lengthwise of the kiln from its inlet to its discharge end, hot combustion gases are passed through the kiln from a burner discharging into the kiln. These gases in the kiln, as well as the gases exhausting from the kiln, preferably contain small but appreciable amounts of free oxygen, as well as nitrogen, miscellaneous gases from the air or combustion, and large amounts of carbon dioxide and carbon monoxide. The burner, which preferably burns gas, although it could be an oil or solid fuel burner, is adjusted accordingly. The maximum temperature developed in the kiln is quite critical. Preferably it should be at least about 1600° F. to provide the desired heat-hardening action on the pellets, to cause the desired reducing atmosphere to develop in the kiln in the admixture of charge material by decomposition of the solid carbonaceous reductant, and to heat the charge material sufficiently so the carbon-oxide gases will decompose on cooling to form the desired oxide coating on the pellets as described later. The maximum temperature is preferably just below that which causes undesired rings to form in the kiln; preferably the maximum temperature lies between about 1900° F. and 2500° F. However, if a solid reductant having a substantial ash content is used, such as anthracite coal, then the maximum temperature is at the lower end of this range of 1600° F. to 2500° F. The temperature developed in the kiln is also controlled by control of the burner.

Although the air is introduced into the kiln for combustion purposes in such quantity that the gases discharging from the kiln contain small amounts of uncombined oxygen, the atmosphere in the immediate vicinity of the balls in the kiln is strongly reducing because of the development there of carbon monoxide or other reducing gases such as volatiles, resulting from heating of the solid carbonaceous reductant. All portions of the balls are exposed to such strongly reducing atmosphere as the balls tumble in the kiln close to the particles of reductant and the reducing gases emanating therefrom. Such reducing gases appear to travel inwardly into the balls from their exteriors and act upon the iron oxide compounds and the zinc and lead compounds of the balls to reduce them to metallic elements.

The presence of solid reductant inside the balls is not necessary for the reducing action. Indeed, most if not all basic oxygen furnace dusts likely to be used in the process contain so little carbon that there would be substantially less than 1% of carbon in the green balls. However, if desired, the balls could be formed to contain added larger proportions of solid reductant; this, however, tends to reduce the dry strengths of the green balls and the strengths of the pellet product.

The balls are preferably retained in the kiln for about 45 minutes to about three hours, depending on the temperatures developed, the amount of carbon used outside the balls, the amount of zinc, lead or other reducible impurities to be removed, the amount of reduction of the iron oxide that is desired, and the desired degree of hardening of the balls into pellets. The zinc metal is reduced and vaporized from the balls copiously at about 1900° F. and is removed in the gases exhausted from the kiln. Essentially all zinc can be removed from the balls in this manner; in general 95% to 98% of zinc can be removed, to less than 0.1%. As the zinc travels in these slightly oxidizing gases, it is converted into zinc oxide or zinc-iron compounds. Similarly, large proportions, if not essentially all, lead and arsenic compounds that might be present in the dust are also reduced and vaporized at such temperatures; these metals also are converted into solid compounds as they are carried by the gases exhausting from the kiln.

Preferably, the hot kiln exhaust gases, preferably at temperatures of from about 1400° F. to about 1900° F., are passed through a heat exchanger by which heat is transferred from the hot kiln gases to heat the air that is used for the preheating of the balls on the traveling grate before they are discharged into the kiln; if necessary, tempering air may be mixed with the heated air to adjust its temperature to that desired in the range of about 250° F. to 800° F. Part of the heated air, with or without tempering air, may be passed to the burner to act as preheated primary or secondary combustion air. The kiln gases are preferably cooled to a temperature of less than about 400° F. by the heat exchanger means alone or by addition of tempering air if desired, and are then passed to a dust-removal system for removing from the gases dust containing zinc, lead or other materials to prevent their discharge into the atmosphere and also make possible the recovery of economically valuable constituents. Cooling of the kiln gases largely by transfer of heat to the drying air simplifies the dust removal and makes possible use of less expensive equipment such as bag dust collectors.

The admixture of hot pellets from the kiln, together with particles of hot unused reductant, at temperatures of 1600° F. or higher, depending on the maximum kiln temperature, is continuously discharged from the kiln into a cooler. The mixture of pellets and unused reductant is cooled essentially in the absence of air to a temperature of about 300° F. or less which will not damage conveyor belts used to transport the cooled mixture. Preferably an atmosphere of a mixture of carbon dioxide, carbon monoxide and inert air gases is maintained in the cooler, the carbon-oxide gases being formed from the heated reductant in the cooler or being discharged from the kiln into the cooler with the hot charge mixture.

Figure 1:
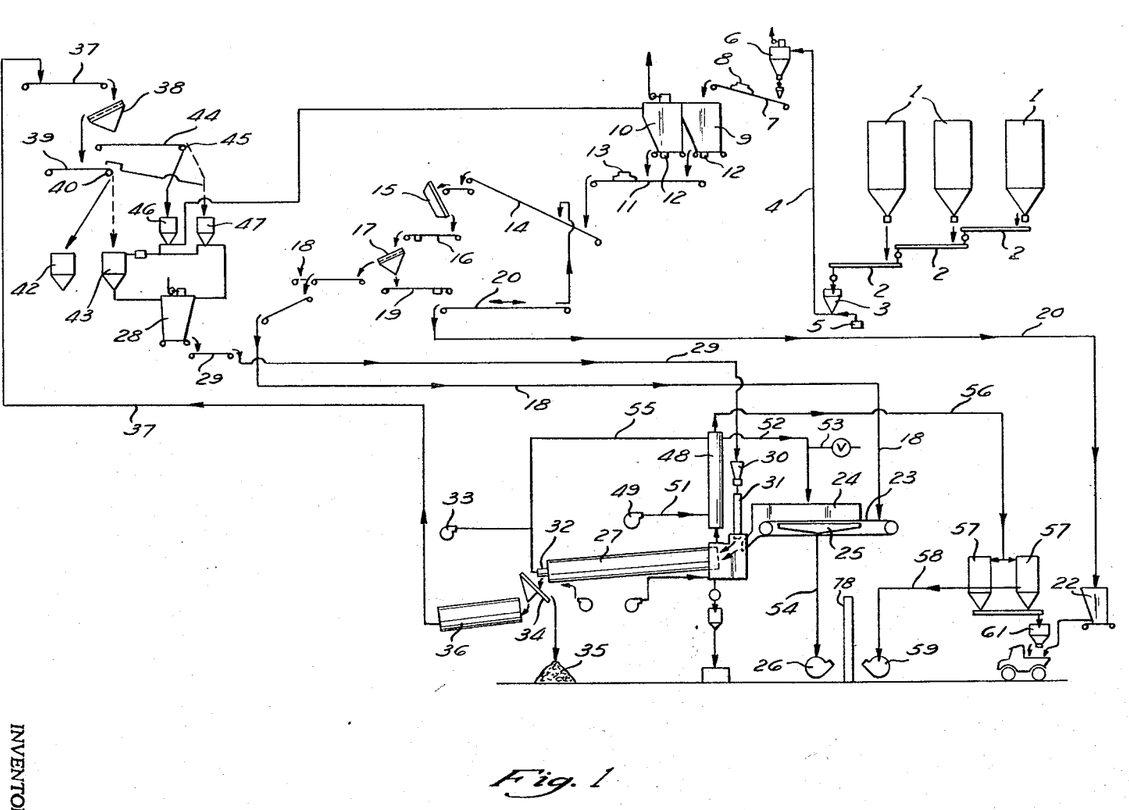
FIGURE 1 is a flow diagram illustrating a process embodying the invention.

FIGURE 1 diagrammatically illustrates a process embodying the invention. In this figure, 1 designates hoppers in which the dust from basic oxygen steel-making furnaces is collected by conventional dust-collecting devices such as electrostatic precipitators. The dust is withdrawn from each of the hoppers by a screw feeder 2 and discharged into a holding hopper 3 from which it is passed pneumatically through a line 4 by pneumatic drive means 5 to another hopper 6. As required, the dust from hopper 6 passes on conveyor 7 through mixer 8 to a bin 9. This bin is adjacent another bin 10 that contains return iron oxide fines from the process. Both of these bins discharge onto a conveyor 11, the discharge being controlled by weight-type feeders 12, as required. The dust, with or without the return fines, is mixed by a suitable mixer 13. Such a mixer, as well as mixer 8, can be a commercially available type that mixes the dust as it travels on a conveyor belt, such as the "Pekay" conveyor belt mixer sold by Pekay Machine & Engineering Co., Chicago, Ill. In mixer 13 the dust can be premoistened if desired, and other additives may be added.

The premoistened mixture then passes on conveyor 14 to a conventional balling device 15 which in the illustrated embodiment is shown as a balling disk, although it could be a balling drum or other suitable device. In this balling device, a suitable amount of water is added, together with, if desired, other additives such as bentonite or acid to form the balling mix or mud. Green balls discharged from conveyor 16 from the balling device pass to the screen 17 which discharges all of the balls larger than a predetermined size to the grate feeder 18. Balls smaller than the predetermined size pass by suitable conveyors 19 and 20 either to the conveyor 14 that feeds the balling device, where they are used as seed material, or to a storage bin 22.

Grate feeder 18 deposits the green balls onto horizontal permeable traveling grate 23 in a permeable moving bed of suitable preferably uniform thickness in which the balls do not move relatively to each other. The balls on the bed are moved by the grate under a drying hood 24 and over a windbox 25, by which balls are subjected for a desired period to the desired temperature by heated air drawn by fan 26. The dried balls, which as indicated have considerable strength, are then discharged into the upper end of an inclined, rotating, refractory-lined kiln 27.

Meanwhile, solid reductant, such as coke breeze from bin 28, is discharged by suitable conveying means 29 into hopper 30 having a feeding device that feeds the proper proportion of coke to the balls into the rotary kiln through chute 31.

The mixture of green balls and reductant is tumbled in the rotating kiln under the conditions indicated above until the balls become heat-hardened pellets, the zinc and other impurities are largely removed, and the desired reduction of the iron content of the pellets is achieved. Heat is supplied by a gas of fuel oil fired burner 32 that is supplied with combustion air by fan 33.

The mixture of heat-hardened and reduced pellets and reductant is discharged from the lower end of the kiln into the grizzly device 34 which separates and discharges over large agglomerations, mostly from kiln rings, onto the lump pile 35. The mixture of pellets and reductant particles is then discharged into the cooler 36 in which it is indirectly cooled while being shielded from air. The cooled mixture then passes by conveyor 37 to the product screen 38.

Pellets and reductant particles over a predetermined size are then discharged from screen 38 onto conveyor 39 having a magnetic roller 40 at its discharge end. The product pellets, which are magnetic because they contain metallic iron, are deflected into product bin 42 from which they may be removed as required for use or shipment; reductant particles, being non-magnetic, drop into bin 43.

The undersized pellets and reductant particles pass onto conveyor 44 having magnetic roller 45 which separates the pellets into bin 46 and the reductant into bin 47. The separated reductant particles from bins 43 and 47 are then discharged into main supply bin 28 for reuse.

The hot gases exhausted from the kiln 27 at its upper end pass into a heat exchanger 48 where they give up a substantial portion of their heat to ambient air which is supplied to the exchanger by fan 49 and duct 51. The air is heated to a temperature high enough to produce the desired drying temperature in the air passing through duct 52 to hood 24, tempering air being added if required through duct 53. The air passed into hood 24 also passes through the bed of green balls on the grate 23 and through the grate into windbox 25, from which it is drawn through duct 54 by fan 26. A portion of the air heated in the exchanger 48 may also be passed through line 55 to supply preheated primary or secondary combustion air to the burner 32.

The cooled kiln exhaust gases pass from the heat exchanger through duct 56 to conventional dust collecting means 57; these collectors remove from the exhaust gases the dust particles of compounds of zinc, lead, or other impurities that were removed in and carried out of the kiln by the exhaust gases. The cleaned exhaust gases are withdrawn from the collectors by duct 58 and fan 59, and discharged to a stack, not shown. The dust is deposited in a hopper 61, from which it can be removed as required, as for recovery of metal values.

Figures 2, 5:
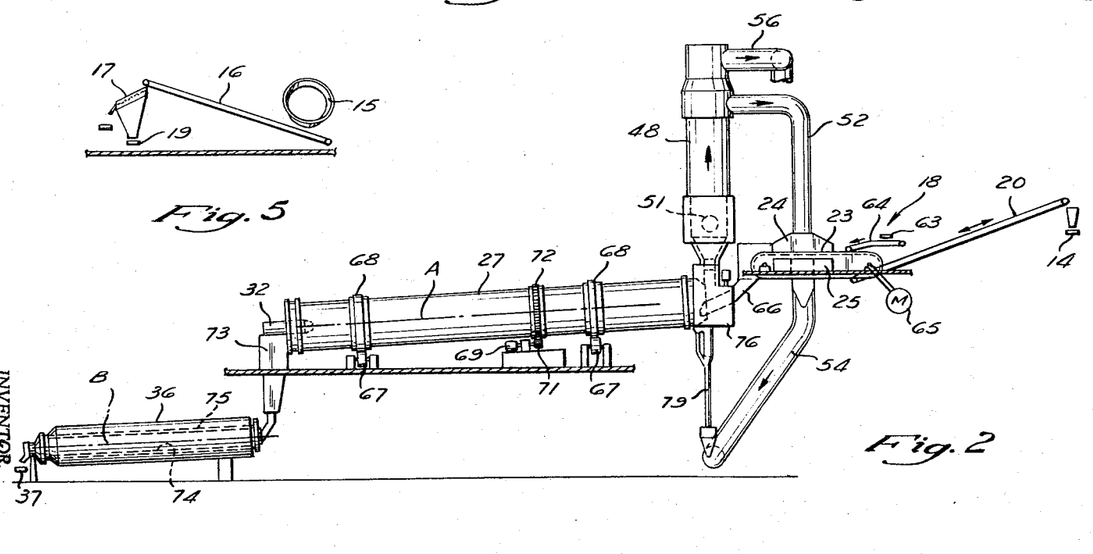
FIGURE 2 is a side elevation of one form of apparatus of the invention, being a portion of that diagrammatically shown in FIGURE 1, for preheating, agglomerating and cooling iron oxide material.
FIGURE 5 is a section of green ball-forming apparatus, from line 5—5 of FIGURE 3.
Figure 3:
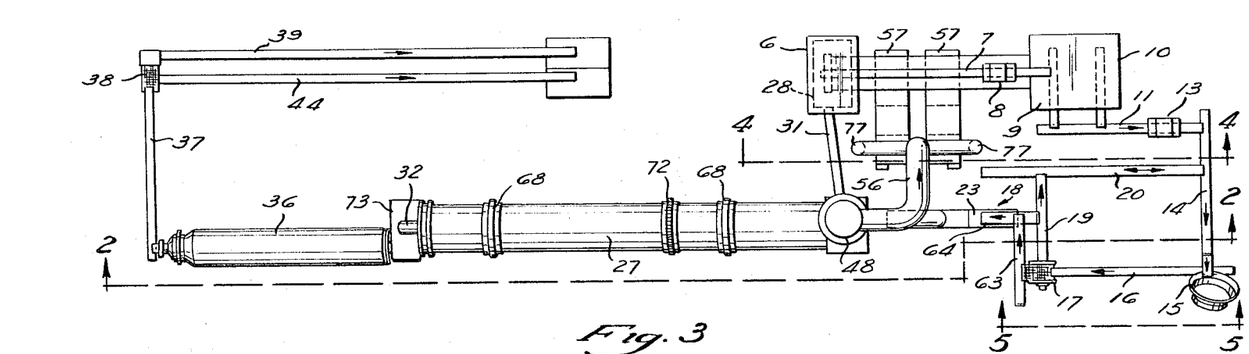
FIGURE 3 is a plan of the apparatus of FIGURE 2.
Figure 4:
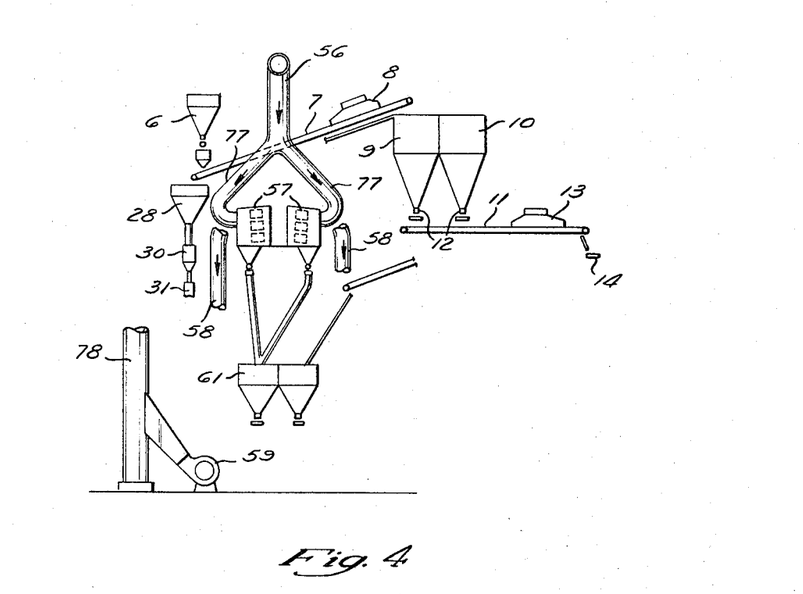
FIGURE 4 is a section showing the means for collecting dust from the exhaust gases of the apparatus of FIGURES 2 and 3.

FIGURES 2 to 5 illustrate in more detail certain apparatus that could advantageously be used in carrying out steps of the process. In these figures, parts corresponding to the parts indicated in connection with FIGURE 1 have the same reference numerals. As shown in FIGURES 3 and 4, the holding hopper 6 for the basic oxygen furnace dust discharges onto the conveyor 7 on which the dust is mixed by mixer 8, and which discharges the dust into the storage bin 9, located adjacent the magnetic return fines storage bin 10. Both of these storage bins are located to discharge onto conveyor 11 passing under premoistening mixer 13 and discharging onto conveyor 14 that is adapted to discharge into the balling disk 15. Green balls are discharged from the balling disk onto the conveyor 16 which discharges them onto screen 17. Balls under the size predetermined by the screen discharge onto conveyor 19 which passes them to conveyor 20. This latter conveyor, which is adapted to move in either direction, is adapted to return the undersize balls to the conveyor 14 discharging into the balling device, or to discharge them to the bin 22 (FIGURE 1). By this means the amount of recycled undersized balls returned to the balling disk can be controlled to permit production of the desired volume of balls of uniform desired size.

The green balls of the proper size that pass over screen 17 are discharged onto grate feeder 18; this illustrated feed device is of the type disclosed and claimed in M. J. Greaves et al. U.S. Patent 3,184,037, issued May 18, 1965. The illustrated device comprises an endless conveyor 63 having a reciprocating discharge end that deposits the green balls across another conveyor 64 that discharges the balls in a layer of highly uniform thickness on the top run of a horizontal grate 23 having a permeable hearth. This grate may be similar to the traveling grate apparatus commonly used in pelletizing in which a moving grate is made up of abutting channel-cross sectioned pallets which are returned in a lower run, or it may be of other types providing a moving permeable support for a bed of balls in which the balls are at rest relative to each other. The illustrated grate is power-driven by motor means 65. Hearth and/or side layers of grate-protective material may also be deposited on the grate before or simultaneously with the green balls to protect the grate from heat, but there is no substantial need for such layer because of the relatively low maximum temperature to which the grate is subjected.

The upper run of the grate carrying the green balls travels under drying hood 24 and over windbox 25, by which hot air is passed through the bed of balls to dry them as indicated above.

The balls discharge from the grate through an enclosed chute 66 into the kiln 27. Simultaneously, the solid reductant, such as coke, of the kind and size indicated above, is discharged into the kiln from the bin 28, through chute 31.

The kiln may be of conventional design, comprising a generally cylindrical steel jacket that is lined with refractory material. The kiln is supported on rollers 67 contacting circumferential tracks 68 fixed to the exterior of the kiln, and is positively rotated about its axis A at a desired speed by motor 69 driving pinion gear 71 engaging ring gear 72 on the kiln. The kiln is inclined from the horizontal, with its inlet end higher than its discharge end, by an amount suitable to provide for the desired travel of the charge mixture through the kiln from its inlet end to its discharge end and to provide the desired dwell of the balls in the kiln.

At its discharge end, the kiln has a housing 73 through which projects the burner 32 adapted to burn the desired fuel, which preferably is gas, although it may be liquid or other suitable fuel; this housing conducts the hot mixture of hardened reduced pellets and undecomposed solid reductant to the cooler 36 without exposing it to ambient air. The illustrated cooler is of a commercially available design, being of cylindrical configuration, mounted for rotation about an inclined axis B and positively driven by a suitable source of power, not shown. The cooler includes a central chamber 74 through which the hot mixture of pellets and reductant passes, surrounded by a water jacket 75 through which is circulated water to extract heat from the hot material. The atmosphere in the inner chamber 74 containing the hot mixture essentially comprises carbon dioxide, carbon monoxide, nitrogen and other inert air gases, from sources described previously.

As shown in FIGURE 3, the cooled mixture of pellets and reductant from the cooler discharges into a conveyor 37 that carries it to screen 38 that separates the larger particles onto the conveyor 39, and the undersized particles onto conveyor 44, from which conveyors the particles pass to separating means as previously described.

The hot exhaust gases leaving kiln 27 at its higher end pass through a housing 76 through which reductant and ball chutes 31 and 66 discharge and which communicates with the lower end of heat exchanger 48. In the heat exchanger, these gases transfer a substantial portion of their heat to ambient air that enters the exchanger through duct 51 and leaves it through duct 52 to pass to hood 24. From this hood this hot air passes through and dries the green balls on the grate hearth 23, through the hearth, and into the windbox 25, the air being thus drawn downwardly by fan 26, communicating with the windbox by duct 54; the air is then discharged from the system. As indicated previously, a part of the air heated in the heat exchanger could be used for combustion air; and the heated air can be cooled, if necessary, by tempering air from duct 53 (FIGURE 1).

The cooled exhaust gases, which contain dust particles of zinc compounds and compounds of other metals such as lead that were reduced and vaporized in the kiln, pass from the heat exchanger 48 through duct system 77 to dust collectors 57 (FIGURE 4) which may be bag-type dust collectors. The exhaust gases pass through ducts 58 from the dust collectors, being drawn by fan 59 which discharges the cleaned gases to the stack 78 (FIGURE 4). The dust removed by the dust collectors passes to bin 61 from which it may be recovered.

As shown in FIGURE 2, the illustrated apparatus also includes chute means 79 for collecting backspill material from the inlet end of the kiln.

EXAMPLES

A number of tests were run on green balls formed by conventional balling apparatus of basic oxygen furnace dust comprising approximately 90% by weight having a particle size smaller than 325 mesh, and about 10% by weight having a particle size greater than 28 mesh. The powder was intimately mixed into a balling mixture comprising by weight .5 to 1% hydrochloric acid in a 15% aqueous solution, about 2% bentonite and a suitable amount of water. Continuous balling was maintained to produce uniformly sized, well shaped green balls about 7/16" in diameter, having set compressive strength of 2.5 to 3 lbs. The balls were then dried while immovable relative to each other until they had a moisture content of about 4.7%; their dry compressive strengths were from 17 to 25 lbs.

The green balls had the following analysis:

| Constituent— | Percentage |
|---|---|
| Zn | 1.68 |
| Fe total | 60.10 |
| C | 0.76 |
| P | 0.075 |
| S | 0.071 |
| MnO | 1.61 |
| $SiO_2$ | 3.00 |
| CaO | 6.20 |
| MgO | 1.95 |
| $Al_2O$ | 0.50 |
| $As_2O_3$ | 0.01 |
| PbO | 0.38 |

The balls were then subjected to various heating conditions in a cylindrical refractory-lined kiln 12' 6" long and 15" in internal diameter, having a 2½" thick refractory throat located at the discharge end. The kiln was rotated at 6 r.p.m. during the test.

The major variables investigated are:

(1) Processing temperatures at four levels—1970° F., 2070° F., 2170° F. and 2270° F.
(2) Retention time at four levels—45, 60, 120 and 180 minutes
(3) Internal reductant at three levels—0%, 4% and 8% —100 mesh coke and the green balls
(4) Reductant size at two levels—⅜" x 3/16" and 1" x ⅜" coke breeze The results of the processing temperature tests are given by the following table:

| Constituents | Green Balls | Processing Temperature, °F. | | | |
|---|---|---|---|---|---|
| | | 1,970 | 2,070 | 2,170 | 2,270 |
| Zinc Content, percent | 1.68 | 0.03 | 0.06 | 0.05 | 0.02 |
| Total Iron, percent | 60.1 | 78.80 | 78.80 | 76.43 | 82.85 |
| Metallic Iron, percent | N.D. | 59.84 | 64.42 | 53.58 | 64.22 |
| Lead Oxide, percent | 0.38 | Nil | Nil | Nil | Nil |
| Oxygen Index, percent | 0 | 83.7 | 87.9 | 77.6 | 82.0 |
| Compressive Strength, lbs | | 51 | 126 | 105 | 1,062 |
| Tumble Index, percent (−28 mesh) | | 8.41 | 7.22 | 1.14 | 1.24 |

This shows that over the temperature ranges investigated zinc elimination and iron oxide reduction were consistently high and not appreciably affected by temperature. Zinc content was reduced by 95% to 98% to less than 0.1%; lead was almost entirely removed, to less than .01% of lead oxide in the finished pellets. Total iron was increased from 60.1% of the dried balls to 75% to 80% in the reduced balls, including 53% to 64% metallic iron.

The oxygen index included in the above table was calculated to determine the percentage reduction of the oxygen initially combined with the iron oxides in the dust; chemical analyses showed that 84% to 88% of this oxygen had been removed during reduction in these tests.

However, the physical quality of the pellets was notatably influenced by temperature changes. Operation at 1970° F. resulted in relatively low compressive strength and relatively high tumble index of 8.41% at −28 mesh; increasing temperature improved product quality, with strength up to 1062 lbs. per pellet and a tumble index of only 1.2% at 2270° F.

The tumble index was the amount of material passing through a 28 mesh screen after 50 pounds of the pellets were tumbled for 200 revolutions at 25 r.p.m. in a coke test tumble drum like that described in ASTM Specifications Code D294–50.

The results of the tests on retention in the kiln are as follows, the tests being all carried out a a processing temperature of 2170° F.:

| Constituents | Green Balls | Retention Time, minutes | | | |
|---|---|---|---|---|---|
| | | 45 | 60 | 120 | 180 |
| Zinc Content, percent | 1.68 | 0.03 | 0.04 | 0.05 | 0.006 |
| Total Iron, percent | 60.1 | 76.11 | 78.15 | 76.43 | 72.89 |
| Metallic Iron, percent | N.D. | 60.72 | 68.96 | 53.58 | 53.19 |
| Lead Oxide, percent | 0.38 | Nil | Nil | Nil | Nil |
| Oxygen Index, percent | 0 | 86.2 | 92.1 | 77.6 | 81.9 |
| Compressive Strength, lbs | | 222 | 196 | 105 | 305 |
| Tumble Index, percent (−28 mesh) | | 2.76 | 1.90 | 1.14 | 3.07 |

The feed balls for the test at 45 minutes also contained 8% solid admixed fuel. These data show that the pellet product was consistently low in zinc and lead content and that approximately the same high level of reduction was achieved over a four-to-one range of retention time. There appeared to be a definite relationship between retention time and procesing temperatures. Pellet compressive strengths and tumble indexes were improved as retention time and processing temperature are increased.

The tests of the use of balls with internal reductant show that no significant reduction in zinc content or increases in metallization was obtained by the use of up to 8% internal fuel. The internal solid reductant, however had an adverse effect on the pellet quality in that the compressive strength decreased from 258 lbs. for the pellets having no internal fuel to 58 lbs. for those containing 8% fuel, while the tumble index rose from 2.09% to 7.78%.

The effect of the size of the solid reductant is illustrated by the tests carried out and reported in the following table. Four tests were carried out for each reductant size; in these tests, comparable conditions of retention time and processing temperature of 2070° F. to 2270° F. were used for each reductant size:

| Constituents | Green Balls | Reductant Size, inches | |
|---|---|---|---|
| | | ⅜ x 3/16 | 1 x ⅜ |
| Zinc Content, percent | 1.68 | 0.054 | 0.354 |
| Total Iron, percent | 60.1 | 78.45 | 68.90 |
| Metallic Iron, percent | N.D. | 66.64 | 14.92 |
| Oxygen Index, percent | 0 | 89.4 | 44.8 |
| Compressive Strength, lbs | | 481 | 261 |
| Tumble Index, percent (−28 mesh) | | 1.71 | 1.48 |
| Carbon Content, percent | 0.76 | 0.54 | 0.63 |

It is apparent that greatly improved results were obtained with finer coke. The lower reactivity of the coarse coke lead to significant increases in the zinc content of the final pellets. Iron oxide reduction and oxygen index were greatly increased by use of smaller coke particles. Lower physical strengths also resulted from the coarse reductant.

In all of the above tests, a weight ratio of 1 to 1 of pellets and solid reductant was used to insure an excess of reductant. Carbon consumption was not appreciably affected by processing temperature or retention time, and averaged about 50% of the available fixed carbon over the entire test series.

Analysis of the sludge formed in the dust collectors from the dust collected from the exhaust gases from the kiln showed that the sludge contained by weight approximately 5.25% of zinc, 19.01% of iron, and 33.4% of carbon.

The pellets produced according to the invention have a structure in which there is a core comprising an intergrown matrix of metallic iron and wustite, the core having considerable porosity. Total porosity may range from about 15% to about 30% of total volume of the pellets. Preferably, the reduction has been carried out until the entire core is formed of such a matrix, and there is no central portion of unreduced original iron oxide; however, since reduction progresses from the outer surface of the green ball inwardly, lesser processing times and reducing conditions can provide a core of unreduced original iron oxide. The pellets are also characterized by an essentially continuous, essentially moisture-impermeable, hard, highly dense, tough and highly adherent outer coating or shell unusually from 2 to 15 microns in average thickness, although it could be thicker, of iron oxide compound which under microscopic examination appears to be wustite.

Normally reduced metallic iron pellets are extremely pyrophoric, oxidizing actively at ambient temperatures. The above indicated surface coating, however, is relatively unreactive, rendering the reduced pellet product substantially inert to reoxidation and deterioration under weathering conditions. This outer shell also adds to the strength of the pellet. The porous interior structure of the pellet facilitates melting of the pellets and also reaction in smelting furnaces. The substantial amount of reduced iron in the pellets makes them useful as a charge for basic oxygen furnaces, as a charge for blast furnaces, in which case substantial fuel savings result.

Figure 6:
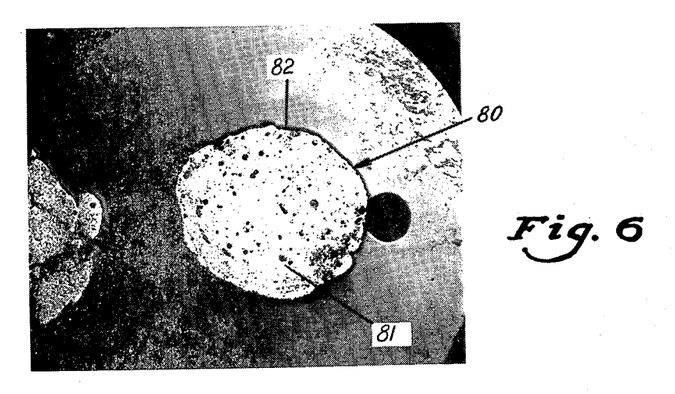
FIGURE 6 is a photomicrograph, to a low magnification, of a cross section of one of the pellets of the invention.
Figure 7:
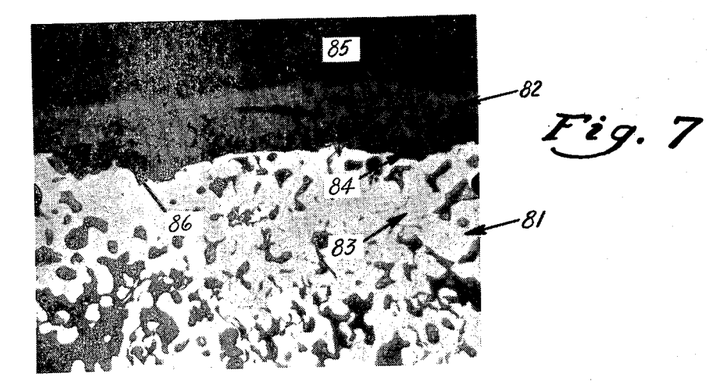
FIGURE 7 is a photomicrograph to a magnification of 500× of a portion of the cross section of such a pellet, showing the surface coating and a portion of the interior core of the pellet.
Figure 8:
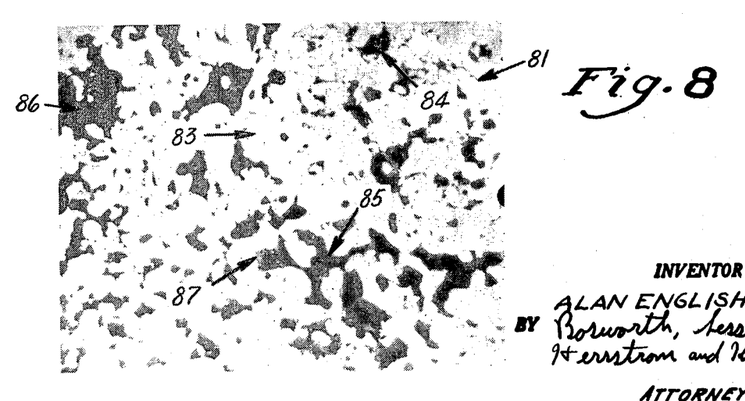
FIGURE 8 is a photomicrograph to the same magnification of a portion of the core alone of the pellet.

FIGURE 6 shows a moderately enlarged view of a cross section of a pellet 80 embodying the invention, containing no admixed reductant; the pellet comprises a core 81 and the above described outer coating or shell 82. FIGURES 7 and 8 show the photomicrographs of portions of such a pellet magnified five hundred times. FIGURE 7 shows the outer coating 82 and a portion of the core 81; FIGURE 8 shows only a portion of the core 81. These figures indicate that the outer coating 82 largely comprises wustite, while the core 81 comprises a large proportion of reduced iron 83, and small proportions of slag 84, wustite 85, voids 86 and unreduced iron oxide 87.

Although the photomicrographs relate to a pellet which had no solid reductant therein, since, as indicated above, this is not necessarily beneficial, if particles of a solid reductant such as coke had been initially present in the green balls, the resulting pellets would be characterized by a core having somewhat greater porosity, and possibly some particles of solid reductant, but in general the microstructure would be similar to that shown in FIGURES 6, 7 and 8.

In carrying out the process of the invention, it appears that there is essentially no reaction occurring during the initial drying stage in which the pellets are dried in air at approximately 250° F. to 800° F. There is essentially no grain growth or bridging of grains during this stage.

After the green balls, together with the solid reductant, are initially introduced into the kiln, the temperature of the solid reductant is raised from substantially ambient temperatures and the green balls are raised from a temperature between about 250° F. and 800° F., heating being accomplished by the gases in the kiln largely produced by the burner 32; as is indicated above, air is introduced in a proportion such that there is a slight amount of oxygen in the gases leaving the kiln in the vicinity of the green balls and solid reductant entering the kiln. The initial heating discharges volatile matter from the solid reductant; this occurs over about the first third of the length of the kiln traveled by the mixture. The mixture of green balls and solid reductant traveling through the remainder of the kiln is then heated by the gas stream until active combustion of the solid reductant occurs, with evolution of carbon dioxide and carbon monoxide, as indicated by the following equations:

(1) $\qquad C+O_2 \rightarrow CO_2$
(2) $\qquad C+\frac{1}{2}O_2 \rightarrow CO$ The carbon monoxide is not stable until the processing temperatures in the kiln exceed about 1300° F., as below this temperature carbon deposition occurs by the following reaction:

(3) $\qquad 2CO \rightarrow C+CO_2$

At temperatures above 1600° F., the hematite and/or magnetite formed of iron oxide in the green balls appears to be reduced by the carbon monoxide to wustite and then to be finally reduced to metallic iron, as indicated by the following approximate reactions:

(4) $\qquad Fe_2O_3+CO \rightarrow 2FeO+CO_2$
(5) $\qquad Fe_3O_4+CO \rightarrow 3FeO+CO_2$
(6) $\qquad FeO+CO \rightarrow Fe+CO_2$ It should be noted that the formula FeO only approximately indicates the composition of the intermediate reduced product, since as indicated at page 295 of the book "The Making, Shaping and Treating of Steel," 8th edition, 1964, the stoichiometric ferrous oxide does not exist.

Since the green balls are rotated as they are tumbled and rolled in the rotary kiln, a continuous metallic iron layer is created on the pellet surfaces, which iron layer increases in thickness as the reduction action proceeds inwardly of the pellet. By the processing conditions indicated above, it is possible to completely reduce the original iron oxide in the green balls so that the core of the resulting pellets can be completely reduced, as indicated above.

According to the above described process, the hot mixture of reduced iron pellets and solid reductant at a temperature of over 1600° F. is then discharged from the kiln and cooled indirectly without air or water quenching but in essentially the same atmosphere as the mixture of charge material in the kiln. This occurs because as the mixture is charged into the cooler, it carries with it some of the atmosphere of the reducing bed, even though the general flow of gases is in the opposite direction through the kiln, and because the incandescent carbon of the discharged mixture combines with the oxygen in any small amount of air that may be present in or leak into the cooler.

As cooling progresses, decomposition of any carbon monoxide present occurs in about the range of 1300° F. as set forth in Equation 3 above. This causes carbon deposition and production of carbon dioxide. When the proportion of carbon dioxide is sufficient, as because of increase of carbon dioxide and decrease of carbon monoxide due to the above reaction, reoxidation of the surface layer of the metallic iron occurs by reversal of reaction (6), as indicated by the following approximate reaction:

(7) $\qquad Fe+CO_2 \rightarrow FeO+CO$

This causes the formation of the above described thin layer 82 on the pellet surfaces.

Figure 9:
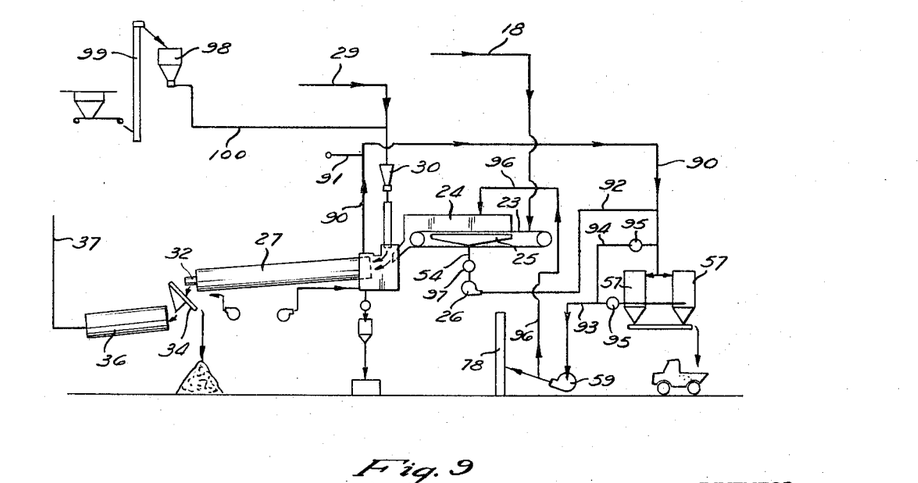
FIGURE 9 is a flow diagram illustrating another process embodying the invention.

FIGURE 9 is a portion of another flow diagram illustrating a modified process embodying the invention. This flow diagram portion replaces the lower portion of flow diagram of FIGURE 1, all other portions of the complete diagram being the same as in FIGURE 1, including means for supplying to the apparatus of FIGURE 9 green balls by conveyor means 18 and coke by conveyor means 29.

In the flow diagram of FIGURE 9, a traveling grate 23 discharges green balls into a rotating kiln 27 which discharges agglomerated and reduced pellets to cooler 36; the grate 23, kiln 27, and cooler 36 may be similar to those previously described.

In the flow diagram illustrated in FIGURE 9 the heated gases for drying the green balls on the traveling grate 23 receive heat from the heat exhaust gases leaving the kiln in a different manner than in the flow diagram illustrated in FIGURE 1. The hot exhaust gases leaving the kiln in FIGURE 9 pass through duct 90 to the dust-collecting means 57, ambient tempering air being added through a branch duct 91 as required to reduce the gas temperature. Gases are also added to this exhaust gas-air mixture through duct 92 connected to the fan 26 that draws drying gases downdraft through the traveling grate through duct 54. The dust-laden gases from the kiln are thus cooled to a temperature low enough to prevent damage to the bag dust collectors, which temperature may be 550° F. or less. The essentially dust-free gases, at a temperature in the neighborhood of 400° F. leave the bag dust collectors through duct 93, being exhausted by fan 59. A duct 94 extends between ducts 90 and 93 to permit bypassing of dust collectors when required, as when dust is being removed, valves 95 being provided for the purpose. Part of the gases discharged from fan 59 at temperatures of about 400° F. pass to the stack 78, and the necessary part of them pass through duct 96 to hood 24 over the grate 23, from which they pass downdraft through the bed of balls on the grate to dry the balls as previously described.

The amount of gases passing from the exhaust fan 26 to the duct 90 can be automatically metered by suitable valve means 97, if desired, any excess of these gases being discharged to the stack if desired.

In the apparatus of FIGURE 9, moreover, an auxiliary source of coke is provided, facilitating the use of coke breeze. In this apparatus a coke bin 98 is supplied with coke breeze by suitable elevator means 99. The moist coke breeze, having a moisture content of about 10% to about 20% by weight, may then be pneumatically passed through duct 100 to the hopper 30 which also receives coke from the source shown in FIGURE 1.

The process illustrated in FIGURE 9 thus provides particularly effective recovery of heat that might otherwise be lost in waste gases.

With certain types of finely divided iron oxide materials, particularly certain dusts from basic oxygen steel making furnaces, it is particularly beneficial to agglomeration to age the finely divided material for at least about 12 hours after it has been moistened but before it is formed into green balls. This could, for example, be done in the above described processes by aging the finely divided moistened material, containing from about 4% to about 10% by weight of water, for from about 12 hours to about 72 hours after it leaves the premoistening mixer 13 and before it is subsequently treated. Such aging aids in wetting, and hence balling, particles of finely divided iron oxide materials which are particularly difficult to wet, as because of exceptionally small particle sizes.

The foregoing description makes apparent to those skilled in the art that the invention provides new and improved process and apparatus for producing new and highly advantageous iron-containing pellets that may be used in a blast furnace or that may be used in basic oxygen furnaces in place of scrap, depending on the amount of reduced iron in the pellets. The pellets of the invention need not necessarily be produced by the process and apparatus described above, although they are particularly advantageous in making possible the production of such pellets at high rates of production under accurately controlled conditions.

It will be apparent to those skilled in the art that the process, apparatus and pellets may be modified in manners other than those indicated above without departing from the spirit of the invention.

It is intended that the patent shall cover, by suitable expression in the appended claims, whatever features of patentable novelty reside in the invention.

I claim:

1. The process of agglomerating iron oxide fines containing a minor amount of a reducible compound of a non-ferrous normally solid element having a melting point substantially lower than iron, comprising forming said iron oxide fines into substantially round green balls; drying said balls at a temperature of between about 250° F. and about 800° F.; causing said balls and particles of solid reductant to form a thoroughly intermixed admixture in which said reductant constitutes a substantial proportion of the weight of the iron oxide in the balls; heating said admixture, while agitating it, by hot products of combustion of fuel and air that are controlled to produce in said admixture a temperature between about 1600° F. and about 2500° F. that promotes in said admixture reduction of the iron oxide and said non-ferrous element compound in said balls and converts said balls into strong pellets having a substantial content of metallic iron; cooling said pellets; exhausting the gases from said admixture; and recovering from said gases dust having a major portion of said non-ferrous element originally present in the iron oxide fines.

2. The process of agglomerating iron oxide fines containing appreciable amounts of a reducible zinc compound, comprising forming said iron oxides fines into substantially round green balls, drying said balls at temperatures of between about 250° F. and about 800° F., causing said balls and particles of solid reductant to form a thoroughly intermixed admixture in which said reductant constitutes by weight at least about 50% of the weight of the iron oxide in the balls, heating said admixture, while agitating it, by hot products of combustion of fuel and air that are controlled to produce in said admixture a temperature between about 1600° F. and about 2500° F. that promotes in said admixture reduction of the iron oxide and said zinc compound in said balls and converts said balls into strong pellets having a substantial content of metallic iron; cooling said pellets in an atmosphere essentially comprising a mixture of carbon dioxide, carbon monoxide and non-oxidizing air gases; and exhausting the gases from the above said admixture and removing zinc compounds from said gases.

3. The process of making hard, discrete pellets from finely divided reducible iron oxide fines capable of being agglomerated by heat and containing a minor amount of a reducible compound of a non-ferrous normally solid element having a melting point substantially lower than iron, comprising making individual green balls of preselected size of said fines; forming said balls into a movable body with said balls at rest relative to each other within said body; establishing first, second and third gas-confining zones; conveying said body of balls through said first zone; disrupting said body of balls and tumbling said balls through said second zone in admixture with particles of solid reductant; subjecting said body of balls in said first zone to a temperature of about 250° F. to about 800° F. for from about 4 to about 10 minutes, by means of hot gases until said balls are dry, preheated and strong enough to enable them to withstand tumbling in said second zone without, however, undergoing appreciable growth of grains into bridging relationship of the oxidized material; then before any such appreciable grain growth and while the balls are still hot, discharging said balls from said first zone along with particles of solid reductant in the proportion of at least about 50% of the weight of the iron oxide in the balls, into said second zone; effecting a flow of hot combustion gases through said second zone sufficient to develop in the tumbling admixture of balls and reductant a temperature of about 1900° F. to about 2500° F. that causes development by combustion of the reductant of reducing conditions in the vicinity of said balls as they tumble; continuing said tumbling of said balls in admixture with said solid reductant particles in said second zone under said temperatures and reducing conditions to cause a substantial proportion of the oxide material in said balls to be totally reduced to metallic iron and recrystallized so that adjacent grains are in bridging relationship sufficient to convert said balls into hard, strong, discrete pellets and to cause a major proportion of said non-ferrous compound to be reduced; discharging said pellets from said second zone into said third zone at a temperature substantially in excess of 1300° F.; cooling said pellets in said third zone while maintaining therein an atmosphere of carbon dioxide and carbon monoxide and essentially no other oxidizing gases, that oxidizes the surface of said pellets as they cool to form a thin layer of an iron oxide compound that is substantially continuous on the surface of each pellet; exhausting said gases from said kiln; and recovering from said gases dust containing said non-ferrous element.

4. The process of making hard, discrete pellets from finely divided, reducible basic oxygen furnace dust comprising fines containing a major amount of iron oxide and minor amounts of a reducible zinc compound, comprising making individual green balls of preselected size of said fines; forming said balls into a movable body with said balls at rest relative to each other within said body; establishing first, second and third gas-confining zones; conveying said body of balls through said first zone; disrupting said body of balls and tumbling said balls through said second zone in admixture with particles of solid reductant; subjecting said body of balls in said first zone to a temperature of about 250° F. to about 800° F. for from about 4 to about 10 minutes, by means of hot gases until said balls are dry, preheated and strong enough to enable them to withstand tumbling in said second zone without, however, undergoing appreciable growth of grains into bridging relationship of the oxidized material; then before any such appreciable grain growth, discharging said balls from said first zone, along with particles of solid reductant in the proportion of at least about 50% of the weight of the iron oxide in the balls, into said second zone, effecting a flow of hot combustion gases through said second zone sufficient to develop in the tumbling admixture of balls and reductant a temperature of about 1900° F. to about 2500° F. that causes development by combustion of the reductant of reducing conditions in the vicinity of said balls as they tumble; continuing said tumbling of said balls in admixture with said solid reductant particles in said second zone; under said temperatures and reducing conditions to cause a substantial proportion of the oxide material in said balls to be totally reduced to metallic iron and recrystallized so that adjacent grains are in bridging relationship sufficient to convert said balls into hard, strong, discrete pellets and to cause a major proportion of said zinc compound to be reduced; discharging said pellets from said second zone into said third zone at a temperature substantially in excess of 1300° F.; cooling said pellets in said third zone while maintaining therein an atmosphere of carbon dioxide and carbon monoxide and essentially no other oxidizing gases, that oxidizes the surface of said pellets as they cool to form a thin layer of iron oxide compound that is substantially continuous on the surface of each pellet; exhausting said gases from said kiln; and recovering from said gases dust containing zinc.

5. The process of forming weather-resistant coatings on agglomerates having surfaces essentially of metallic iron produced by reduction of iron oxide in said agglomerates, comprising heating said agglomerates under non-oxidizing conditions to a temperature substantially above 1300° F., and then cooling said agglomerates in an atmosphere of carbon dioxide, carbon monoxide and essentially no other oxidizing gases that at temperatures below about 1300° F. causes carbon monoxide present to decompose into carbon dioxide in sufficient proportion to cause oxidation of said metallic iron, and maintaining said pellets in said atmosphere for a sufficient time to form on the surfaces of said agglomerates essentially continuous, thin, dense, highly-adherent, essentially moisture-impermeable coatings of iron oxide material over the surfaces of said reduced agglomerates.

6. The process of making hard, discrete pellets containing a substantial portion of metallic iron comprising making individual green balls of finely divided reducible iron oxide material; heating said balls in the presence of reducing gases at a temperature of at least about 1600° F. under conditions that will produce hardened pellets and reduce to metallic iron a substantial proportion of the iron oxide therein and form a surface on said pellets that is essentially metallic iron; and cooling said pellets from a temperature substantially in excess of about 1300° F. in an atmosphere of carbon dioxide, carbon monoxide and essentially no other oxidizing gases that at temperatures below about 1300° F. causes carbon monoxide to decompose into carbon dioxide in sufficient proportion to cause oxidation of the metallic iron on the surfaces of said pellets, and maintaining said pellets in said atmosphere for a sufficient time to form a thin layer of an iron oxide material that is substantially continuous on the surfaces of said pellets.

7. The process of making hard, discrete pellets containing a substantial proportion of metallic iron from finely divided, reducible, iron oxide material comprising making individual green balls of said finely divided material; forming said balls into a movable body with said balls at rest relative to each other within said body; establishing first, second and third gas-confining zones; conveying said body of balls through said first zone, discharging said balls from said body into said second zone while said balls are hot and tumbling said balls through said second zone; subjecting said body of balls in said first zone to a temperature between about 250° F. and about 800° F. until said balls are dry, pre-heated and strong enough to enable them to withstand tumbling in said second zone without, however, undergoing appreciable growth of iron oxide grains into bridging relationship; then, before any such appreciable grain growth, and while the balls are still hot, discharging said balls into said second zone; effecting a flow of heated gases through said second zone, to heat said balls to a temperature between about 1600° F. and about 2500° F.; continuing said tumbling of said balls in said second zone while maintaining in the vicinity of said balls temperatures and reducing conditions sufficient to cause a substantial proportion of the iron oxide in said balls to be reduced to metallic iron and to convert said balls into hardened, strong, discrete pellets; discharging said pellets from said second zone into said third zone at a temperature substantially in excess of about 1300° F.; and cooling said pellets in said third zone in an atmosphere of carbon dioxide and carbon monoxide and essentially no other oxidizing cases that at temperatures below about 1300° F. causes carbon monoxide to decompose into carbon dioxide in sufficient proportion to cause oxidation of the metallic iron at the outer surfaces of the pellets, and maintaining said pellets in said third zone for a sufficient time to form a thin, substantially continuous, impervious layer of iron oxide material on the surfaces of said pellets.

8. The process of making hard, discrete pellets from finely divided, reducible, iron oxide material that is capable of being agglomerated by heat comprising making individual green balls of substantially uniform preselected size of said finely divided material; forming said balls into a movable body with said balls at rest relative to each other within said body; establishing first, second and third gas-confining zones; conveying said body of balls through said first zone; discharging said balls from said body into said second zone while the balls are hot and tumbling said balls through said second zone in admixture with particles of solid reductant; subjecting said body of balls in said first zone to a temperature of about 250° F. to about 800° F. for from about 4 to about 10 minutes, by means of hot gases until said balls are dry, preheated and strong enough to enable them to withstand tumbling in said second zone without, however, undergoing appreciable growth of iron oxide grains into bridging relationship, then before any such appreciable grain growth and while the balls are still hot, discharging said balls from said first zone, along with particles of solid reductant in the proportion of at least about 50% of the weight of the iron oxide in the balls, into said second zone; effecting a flow of hot combustion gases through said second zone sufficient to develop in the tumbling admixture of balls and reductant and a temperature of about 1900° F. to about 2500° F. that causes development by combustion of the reductant of reducing conditions in the vicinity of said balls as they tumble; continuing said tumbling of said balls in admixture with said solid reductant particles in said second zone under said temperatures and reducing conditions to cause a substantial proportion of the oxide material in said balls to be reduced to metallic iron and said iron to be crystallized so that adjacent grains are in bridging relationship sufficient to convert said balls into hard, strong, discrete pellets; discharging said pellets from said second zone into said third zone at a temperature substantially in excess of 1300° F.; and cooling said pellets in said third zone in an atmosphere of carbon dioxide and carbon monoxide and essentially no other oxidizing gases, that at temperatures of less than about 1300° F. causes carbon monoxide to decompose into carbon dioxide in sufficient proportion to cause oxidation of the outer surfaces of said pellets, and maintaining said pellets in said third zone for a sufficient time to form a thin layer of iron oxide that is substantially continuous on the surface of each pellet.

9. A hard, dense pellet of substantial compressive strength and good weathering properties and containing a high proportion of iron values, said pellet comprising a core the major portion of which comprises metallic iron forming a part of an intergrown matrix of iron oxide and metallic iron, and said pellet further having a thin, highly-adherent, outside coating of an essentially continuous, essentially moisture-impermeable, hard, dense, iron oxide compound substantially comprising wustite.

10. The pellet of claim 9 in which the core is formed essentially completely of such a matrix, which matrix is porous and the porosity of which is between about 15% to about 30% of the total volume of the pellet.

11. The pellet of claim 9 in which said outside coating is from about 2 microns to about 15 microns in average thickness.

12. The pellet of claim 10 in which said outside coating is from about 2 microns to about 15 microns in average thickness.

13. Apparatus for agglomerating and reducing finely divided solid material containing a major amount of a reducible oxidic material and a minor amount of a reducible compound of a normally solid element having a melting point substantially lower than that of the reduction product of the oxidic material, comprising a generally horizontal traveling grate; means for depositing green balls of said finely divided solid material in a layer on said grate; means for subjecting the balls on said grate to heated air to dry the balls; a rotatable kiln into which said grate discharges heated balls; means for passing heating gases through said kiln to heat said balls under reducing conditions in said kiln to reduce a substantial proportion of the oxidic material in the balls and a major proportion of said reducible compound and to convert said balls into hardened pellets; cooler means into which said pellets are discharged and in which they are cooled essentially in the absence of air; means through which are passed exhaust gases from the kiln and air to transfer heat from said exhaust gases to said air and to cool said exhaust gases; means for conducting said heated air to said grate to dry the balls thereon; and means for removing dust containing said element from said thus cooled exhaust gases.

14. Apparatus for agglomerating and reducing finely, solid material containing a major amount of a reducible oxidic material and a minor amount of a reducible compound of a normally solid element having a melting point substantially lower than that of the reduction product of the oxidic material, comprising a generally horizontal traveling grate; means for depositing green balls of said finely divided, solid material in a layer on said grate; means for subjecting the balls on said grate to heated air to dry the balls; a rotatable kiln into which said grate discharges heated balls; means for discharging particles of solid reductant into said kiln to be admixed with the balls as the kiln rotates; means for passing heating gases through said kiln to cause said balls to be heated under reducing conditions in said kiln to reduce a substantial proportion of the oxidic material and a major proportion of said reducible compound and convert said balls into hardened pellets; cooler means into which said pellets are discharged and in which they are cooled essentially in the absence of air; heat exchange means through which are passed exhaust gases from said kiln and air in heat exchange relation to transfer heat from said exhaust gases to said air and to cool said exhaust gases; means for conducting heated air from said heat exchange means to said grate to dry the balls thereon; and means for removing dust containing said element from said thus cooled exhaust gases after they leave said heat exchange means.

15. Apparatus for agglomerating and reducing finely divided solid material containing a major amount of a reducible oxidic material and a minor amount of a reducible compound of a normally solid element having a melting point substantially lower than that of the reduction product of the oxidic material, comprising a generally horizontal travelling grate; means for depositing green balls of said finely divided solid material in a layer on said grate; means for subjecting the balls on said grate to heated air to dry the balls; a rotatable kiln into which said grate discharges heated balls; means for passing heating gases through said kiln to heat said balls under reducing conditions in said kiln to reduce a substantial proportion of the oxidic material in the balls and a major proportion of said reducible compound and to convert said balls into hardened pellets; cooler means into which said pellets are discharged in which they are cooled essentially in the absence of air; means for removing from said kiln hot exhaust gases containing dust containing said element; means for removing dust containing said element from said hot exhaust gases; and means for conducting said hot exhaust gases, after dust containing said element has been removed therefrom, to said grate to dry the balls thereon.

References Cited

UNITED STATES PATENTS

| | | | |
|---|---|---|---|
| 1,775,313 | 9/1930 | Lellep | 75—3 |
| 2,792,298 | 5/1957 | Freeman | 75—3 |
| 2,855,290 | 10/1958 | Freeman | 75—3 |
| 2,925,336 | 2/1960 | Stowasser | 75—3 |
| 3,169,054 | 2/1965 | Werner | 75—3 |
| 3,185,563 | 5/1965 | Jones et al. | 75—3 |
| 3,196,000 | 7/1965 | Meyer et al. | 75—5 |
| 3,215,521 | 11/1965 | Meyer et al. | 75—5 |

BENJAMIN HENKIN, *Primary Examiner.*

UNITED STATES PATENT OFFICE
CERTIFICATE OF CORRECTION

Patent No. 3,386,816                                                        June 4, 1968

Alan English

It is certified that error appears in the above identified patent and that said Letters Patent are hereby corrected as shown below:

Column 1, line 39, after "dust" insert -- of --. Column 4, line 40, "anp" should read -- and --. Column 11, line 2, "unusually" should read -- usually --. Column 14, line 34, "cases" should read -- gases --.

Signed and sealed this 2nd day of December 1969.

(SEAL)
Attest:

Edward M. Fletcher, Jr.                              WILLIAM E. SCHUYLER, JR.
Attesting Officer                                                  Commissioner of Patents